US010954915B2

(12) United States Patent
Smith et al.

(10) Patent No.: US 10,954,915 B2
(45) Date of Patent: Mar. 23, 2021

(54) WIND TURBINE BLADE MANUFACTURE

(71) Applicant: Vestas Wind Systems A/S, Aarhus N. (DK)

(72) Inventors: Jonathan Smith, Burridge (GB); Steve Wardropper, New Milton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 415 days.

(21) Appl. No.: 15/502,880

(22) PCT Filed: Aug. 11, 2015

(86) PCT No.: PCT/DK2015/050233
§ 371 (c)(1),
(2) Date: Feb. 9, 2017

(87) PCT Pub. No.: WO2016/023555
PCT Pub. Date: Feb. 18, 2016

(65) Prior Publication Data
US 2017/0241401 A1     Aug. 24, 2017

(30) Foreign Application Priority Data

Aug. 12, 2014   (GB) ..................................... 1414284

(51) Int. Cl.
*F03D 1/06*       (2006.01)
*B29C 65/48*      (2006.01)
(Continued)

(52) U.S. Cl.
CPC .......... *F03D 1/0675* (2013.01); *B29C 65/483* (2013.01); *B29C 65/542* (2013.01);
(Continued)

(58) Field of Classification Search
CPC ...... F03D 1/065; F03D 1/0675; F03D 1/0683; F03D 13/10; B29C 65/483; B29C 65/542;
(Continued)

(56) References Cited

U.S. PATENT DOCUMENTS

2003/0116262 A1\*   6/2003   Stiesdal ................ B29C 70/443
                                                                                                                  156/245
2005/0281905 A1\* 12/2005   Uchiyama ............... B29C 45/77
                                                                                                                    425/149
(Continued)

FOREIGN PATENT DOCUMENTS

CN          101149041 A      3/2008
CN          101457781 A      6/2009
(Continued)

OTHER PUBLICATIONS

European Patent Office, International Search Report and Written Opinion in PCT Application No. PCT/DK2015/050233, dated Oct. 14, 2015.
(Continued)

*Primary Examiner* — John M Zaleskas
(74) *Attorney, Agent, or Firm* — Wood Herron & Evans LLP

(57) ABSTRACT

Method of bonding a shear web (50) to a wind turbine blade shell (75) and the obtained blade, wherein the shear web (50) comprises a web and a mounting flange (56) oriented transverse to the web (50). The method involves: providing a seal (66, 68) on the mounting flange (56) of the shear web (50) such that when the mounting flange (56) is positioned against the blade shell (75), a cavity (76) is defined by the seal between the mounting flange (56) and the blade shell (75). The air of the cavity (76) is then evacuated and adhesive is injected into the cavity (76). The use of pieces
(Continued)

(80) to keep the distance between the mounting flange (56) and the blade shell (75) is preferred.

25 Claims, 5 Drawing Sheets

(51) Int. Cl.
   *B29C 65/54* (2006.01)
   *B29C 65/78* (2006.01)
   *B29C 65/00* (2006.01)
   *B29L 31/08* (2006.01)

(52) U.S. Cl.
   CPC ...... *B29C 65/7826* (2013.01); *B29C 65/7841* (2013.01); *B29C 66/00145* (2013.01); *B29C 66/112* (2013.01); *B29C 66/1142* (2013.01); *B29C 66/131* (2013.01); *B29C 66/301* (2013.01); *B29C 66/324* (2013.01); *B29C 66/524* (2013.01); *B29C 66/5326* (2013.01); *B29C 66/54* (2013.01); *B29C 66/61* (2013.01); *B29C 66/636* (2013.01); *B29C 66/721* (2013.01); *B29C 66/9241* (2013.01); *B29C 66/7212* (2013.01); *B29L 2031/085* (2013.01); *F05B 2230/23* (2013.01); *F05B 2280/6003* (2013.01); *Y02E 10/72* (2013.01); *Y02P 70/50* (2015.11)

(58) Field of Classification Search
   CPC ............ B29C 65/7826; B29C 65/7841; B29C 66/00145; B29C 66/112; B29C 66/1142; B29C 66/131; B29C 66/301; B29C 66/324; B29C 66/524; B29C 66/5326; B29C 66/54; B29C 66/61; B29C 66/636; B29C 66/721; B29C 66/7212; B29C 66/9241; B29L 2031/085; Y02E 10/721; Y02P 70/523
   USPC .................................................. 416/225, 226
   See application file for complete search history.

(56) References Cited

U.S. PATENT DOCUMENTS

| | | | | |
|---|---|---|---|---|
| 2006/0049552 A1* | 3/2006 | Fish | .......... | B29C 65/54 264/571 |
| 2008/0057305 A1* | 3/2008 | Grose | .......... | B29C 65/527 428/343 |
| 2008/0075603 A1* | 3/2008 | Van Breugel | .......... | B29C 65/542 416/232 |
| 2008/0148817 A1* | 6/2008 | Miller | .......... | G01M 3/227 73/40 |
| 2008/0219851 A1* | 9/2008 | Althoff | .......... | F03D 1/0675 416/226 |
| 2008/0226869 A1* | 9/2008 | Grose | .......... | B29C 65/527 428/120 |
| 2009/0155084 A1* | 6/2009 | Livingston | .......... | B29C 65/54 416/223 R |
| 2009/0208701 A1* | 8/2009 | Grose | .......... | B29C 65/527 428/120 |
| 2009/0226702 A1* | 9/2009 | Madsen | .......... | B29C 65/5028 428/317.1 |
| 2010/0122459 A1* | 5/2010 | Suffield | .......... | B29C 41/04 29/889.7 |
| 2010/0132884 A1* | 6/2010 | Baehmann | .......... | F03D 1/0675 156/293 |
| 2010/0162567 A1* | 7/2010 | Kirkwood | .......... | B64C 3/28 29/897.2 |
| 2010/0310379 A1* | 12/2010 | Livingston | .......... | F03D 1/0675 416/229 R |
| 2011/0126978 A1* | 6/2011 | Gau | .......... | B29D 99/0028 156/305 |
| 2011/0142663 A1* | 6/2011 | Gill | .......... | F03D 1/0675 416/226 |
| 2011/0142669 A1* | 6/2011 | Althoff | .......... | F03D 1/0675 416/229 R |
| 2012/0027610 A1* | 2/2012 | Yarbrough | .......... | F03D 1/0683 416/226 |
| 2012/0027614 A1* | 2/2012 | Yarbrough | .......... | F03D 1/065 416/226 |
| 2012/0067515 A1* | 3/2012 | Dahl | .......... | B29C 70/467 156/245 |
| 2012/0107128 A1* | 5/2012 | Kontis | .......... | B29C 65/48 416/225 |
| 2012/0114497 A1* | 5/2012 | Petersen | .......... | F03D 1/0675 416/241 R |
| 2012/0237356 A1* | 9/2012 | Mironov | .......... | B29C 70/342 416/232 |
| 2013/0075025 A1* | 3/2013 | Guitton | .......... | B29C 70/68 156/245 |
| 2013/0170991 A1* | 7/2013 | Olesen | .......... | B29C 65/4835 416/61 |
| 2013/0183508 A1* | 7/2013 | Sottiaux | .......... | B32B 25/10 428/216 |
| 2014/0003953 A1* | 1/2014 | Zeller | .......... | F03D 1/065 416/223 R |
| 2014/0064980 A1* | 3/2014 | Griesel | .......... | F03D 1/0675 416/226 |
| 2014/0301857 A1* | 10/2014 | Richers | .......... | B29C 70/42 416/230 |
| 2014/0301859 A1* | 10/2014 | Hancock | .......... | F03D 1/0675 416/230 |
| 2014/0369849 A1* | 12/2014 | Flach | .......... | F03D 1/0675 416/230 |
| 2015/0064014 A1* | 3/2015 | Bakhuis | .......... | F03D 1/0675 416/229 R |
| 2015/0123299 A1* | 5/2015 | Wardropper | .......... | B29C 70/44 264/40.1 |
| 2015/0151509 A1* | 6/2015 | Tompkins | .......... | B32B 5/026 428/158 |
| 2015/0198051 A1* | 7/2015 | Hayden | .......... | B29C 70/84 416/226 |
| 2015/0251370 A1* | 9/2015 | Kirkeby | .......... | B29C 70/342 156/196 |
| 2015/0308402 A1* | 10/2015 | Nielsen | .......... | B29C 66/61 416/229 R |
| 2015/0316026 A1* | 11/2015 | Noronha | .......... | F03D 1/0675 416/226 |
| 2016/0279890 A1* | 9/2016 | Jespersen | .......... | F03D 1/0675 |
| 2018/0328335 A1* | 11/2018 | Smith | .......... | F03D 1/0675 |

FOREIGN PATENT DOCUMENTS

| | | | | |
|---|---|---|---|---|
| CN | 101463796 A | | 6/2009 | |
| CN | 102165186 A | | 8/2011 | |
| CN | 102459875 A | | 5/2012 | |
| JP | 04278320 A | * | 10/1992 | ............ B29C 45/17 |
| WO | 2010023140 A1 | | 3/2010 | |
| WO | 2011000381 A2 | | 1/2011 | |
| WO | 2011064553 A2 | | 6/2011 | |
| WO | WO-2015075014 A1 | * | 5/2015 | ....... B29C 45/14336 |

OTHER PUBLICATIONS

Intellectual Property Office, Search and Examination Report in GB 1414284.8, dated Feb. 13, 2015.

Government of India, Exmaination Report in IN Application No. 201717006287, dated Jul. 24, 2019.

The State Intellectual Property Office of China, First Notification of Office Action in CN Application No. 201580048405.5, dated Jun. 26, 2018.

* cited by examiner

WIND TURBINE BLADE MANUFACTURE

TECHNICAL FIELD

The present invention relates generally to the manufacture of wind turbine blades, and more specifically to an improved method of bonding a shear web to a wind turbine blade shell.

BACKGROUND

Wind turbine blades, such as the long blades employed on modern utility-scale wind turbines, generally comprise a substantially hollow blade shell made primarily of composite materials, such as glass-fibre reinforced plastic. Referring to FIG. 1, this shows a cross-sectional view of a known wind turbine blade 10. The blade shell is made up of two half shells, a windward shell 12 and a leeward shell 14, which are bonded together along the leading edge 16 and trailing edge 18 of the respective half shells 12, 14. Each half shell 12, 14 is made up of a plurality of glass-fibre fabric layers and other structural components such as foam core material 20 and carbon fibre reinforcements 22.

A pair of shear webs 24 are bonded between the respective half shells 12, 14. The shear webs 24 are longitudinally-extending structures that bridge the two half shells 12, 14 of the blade 10 and serve to transfer shear loads from the blade 10 to a wind turbine hub in use. The shear webs 24 are I-beams, i.e. each shear web 24 is substantially I-shaped in cross section, and comprises a generally vertical web 26 disposed between upper and lower mounting flanges 28, 30. The upper and lower mounting flanges 28, 30 are arranged transversely to the web 26 and define substantially flat surfaces for mounting the shear web 24 to the leeward and windward blade shells 14, 12 respectively. More specifically, the lower mounting flange 30 of each shear web 24 is bonded to a respective shear web mounting region 32 defined on an inner surface 34 of the windward half shell 12, whilst the upper mounting flange 28 of each shear web 24 is bonded to a respective shear web mounting region 36 defined on an inner surface 38 of the leeward half shell 14.

A method of manufacturing the wind turbine blade of FIG. 1 will now be described briefly with reference to FIGS. 2a-2c.

Referring initially to FIG. 2a, this shows a mould 40 for the wind turbine blade 10 divided into two female half moulds, a windward mould 42 and a leeward mould 44, which are arranged side by side in an open configuration of the mould 40. The windward blade shell 12 and the leeward blade shell 14 are moulded separately in their respective mould halves 42, 44. As shown in FIG. 2a, the windward blade shell 12 is supported on a mould surface 46 of the windward mould 42 and the leeward blade shell 14 is supported on a mould surface 48 of the leeward mould 44.

After forming the blade shells 12, 14 in the respective mould halves 42, 44, adhesive is applied along the leading edge 16 and trailing edge 18 of the windward half shell 12, and/or along the leading edge 16 and trailing edge 18 of the leeward half shell 14. Adhesive is also applied along the shear web mounting regions 32 defined on the inner surface 34 of the windward half shell 12. Further adhesive is applied along the upper mounting flanges 28 of the shear webs 24 (see FIG. 2b).

Referring to FIG. 2b, once the adhesive has been applied to the various surfaces 16, 18, 28, the shear webs 24 are then lifted into the windward half mould 42 and the lower mounting flanges 30 of the shear webs 24 are positioned against the inner surface 34 of the windward half shell 12 in the mounting regions 32.

Referring now to FIG. 2c, once the shear webs 24 have been positioned against the windward blade shell 12, the leeward mould 44, including the leeward blade shell 14, is lifted, turned and placed on top of the windward blade mould 42. This process is referred to as 'closing the mould'. Under the weight of the leeward half shell 14, the adhesive between the respective half shells 12, 14 and the adhesive between the shear webs 24 and the half shells 12, 14 is squeezed at these respective interfaces. With the mould 40 remaining closed, the adhesive is left to cure, i.e. harden. Once the adhesive has cured, the mould 40 is then opened and the completed blade 10 is removed. The cured adhesive firmly bonds the half shells 12, 14 together and firmly bonds the shear webs 24 to the half shells 12, 14.

In the process described above, once the adhesive has been applied to the various components, it is important to load the shear webs 24 into the windward mould 42 as quickly as possible to avoid the adhesive curing partially before the shear webs 24 are correctly positioned. However, it can be difficult and time consuming to position the shear webs 24 correctly, and if the adhesive cures partially in the meantime its viscosity will increase and this may adversely affect the resulting bondlines between the shear webs 24 and the blade shells 12, 14.

Adhesives such as epoxy, which is typically used in the above process, can adversely react with moisture and carbon dioxide in the air in a process known as 'carbamation'. If this happens, a greasy residue may develop on the adhesive, which may compromise the strength of the bonded joints. For this reason, it is desirable to limit the exposure of the adhesive to air, or otherwise equipment such as de-humidifiers and hot-air blowers can be used to mitigate the risk of carbamation.

Epoxy and many other adhesives may also present a handling hazard to workers. It is therefore desirable to avoid or at least minimise contact with, or exposure to, the adhesive where possible.

Typically several tonnes of adhesive are required to join the blades together and to bond the shear webs in place. In the process described above, a significant proportion of the adhesive is squeezed out of the bonding interfaces when the shells are brought together. This adhesive is effectively wasted, yet it still contributes to the overall weight of the completed wind turbine blade, and represents a substantial material cost.

It is an object of the present invention to provide an improved method of bonding components together which avoids or otherwise overcomes one or all of the above problems.

SUMMARY OF THE INVENTION

According to the present invention there is provided a method of bonding a shear web to a wind turbine blade shell, the shear web comprising a web and a mounting flange oriented transverse to the web, and the method comprising:
  a. positioning the shear web relative to the blade shell such that the mounting flange is in mutually opposed relation with an inner surface of the blade shell;
  b. providing a primary seal between the mounting flange and the inner surface of the blade shell, the seal defining a substantially enclosed primary cavity between the mounting flange and the inner surface of the blade shell;

c. removing air from the primary cavity to create a vacuum in the primary cavity;

d. admitting adhesive into the primary cavity; and e. curing the adhesive.

The method of the present invention is a repeatable process that creates consistently well-defined bondlines. The bondline is defined by the dimensions of the primary cavity, which is filled with adhesive. Wastage of adhesive is eliminated because the adhesive is contained within the primary cavity and there is no 'squeeze out' of adhesive. Accordingly, the material cost of the adhesive and the overall weight of the blade is reduced in comparison to the prior art bonding process.

As the shear web is in position before injection of the adhesive, the risk of the adhesive curing before the web is loaded into the blade and positioned correctly is eliminated. This allows more time to position the web correctly before the bonding process takes place. Also, this allows different adhesives to be used, for example a more reactive adhesive having a faster curing time can be used in the present method.

As the adhesive in the present method does not make contact with the air, the risk of carbamation is avoided. Contact between operators and the adhesive is also advantageously eliminated in the present method because adhesive is injected into the sealed cavity. Accordingly, this reduces any risks to personnel associated with handling adhesive.

The method may comprise providing one or more spacer elements in the primary cavity between the mounting flange and the inner surface of the blade shell. The spacer elements are preferably configured to maintain the mounting flange and the inner surface of the blade in spaced apart relation when a vacuum is created in the primary cavity. This advantageously keeps the primary cavity open and prevents the mounting flange being pulled too close to the inner surface of the blade shell. The spacers also conveniently set the bond height between the shear web and the blade shell. The spacers are preferably made from substantially incompressible material such as wood, plastic or metal.

The method may involve admitting adhesive into the primary cavity via one or more adhesive ports arranged in fluid communication with the primary cavity. The method may further comprise removing air from the primary cavity through one or more vacuum ports provided in fluid communication with the primary cavity. In preferred embodiments of the invention, the adhesive ports and vacuum ports are provided in the mounting flange of the shear web. However, in other examples the ports may be provided elsewhere, for example in the primary seal or in the blade shell.

The method preferably comprises monitoring a pressure in the primary cavity and determining when the cavity is full of adhesive from a sudden change in the monitored pressure. The pressure can be monitored remotely from the shear web, for example at a remotely-located vacuum pump. This advantageously allows the process to be controlled and monitored remotely.

In particularly preferred embodiments of the invention, the method involves providing a secondary seal between the mounting flange and the inner surface of the blade shell. Preferably the secondary seal at least partially surrounds the primary seal, and more preferably the secondary seal completely surrounds the primary seal. The secondary seal is preferably spaced apart from the primary seal to define a peripheral cavity between the primary and secondary seals. The peripheral cavity preferably at least partially surrounds the primary cavity, and more preferably completely surrounds the primary cavity. The method preferably involves removing air from the peripheral cavity to create a vacuum in the peripheral cavity.

Preferably the primary seal and/or the secondary seal are integrated with the mounting flange of the shear web prior to arranging the shear web against the blade shell.

The method preferably comprises removing air from the peripheral cavity through one or more vacuum ports in fluid communication with the peripheral cavity. The vacuum ports are preferably provided in the mounting flange of the shear web, but may alternatively be provided in any other suitable position such as in the secondary seal or in the blade shell.

Preferably the method comprises reducing the pressure in the peripheral cavity to a lower level than in the primary cavity so as to create a stronger vacuum in the peripheral cavity than in the primary cavity. Advantageously the vacuum in the peripheral cavity serves as a clamp around the primary seal and reacts the pressure of the adhesive injected into the primary cavity. This reduces the likelihood of the primary seal being broken by the adhesive pressure. Any air ingress in the process will also be removed via the peripheral cavity and hence away from the bondline.

The method may advantageously comprise monitoring the pressure in the peripheral cavity and detecting the presence of a leak in the primary seal in the event of a sudden change in the monitored pressure. The pressure can advantageously be monitored at a location remote from the shear web, for example at a remotely-located vacuum pump, thus allowing remote monitoring and control of the process.

The method preferably comprises admitting adhesive into the primary cavity once a vacuum has been created in both the primary and peripheral cavities.

The method preferably comprises causing the adhesive to flow in a longitudinal direction within the primary cavity. This can be achieved by spacing the adhesive ports apart from the vacuum ports in a longitudinal direction. In other embodiments the ports may be configured to cause a chordwise flow of adhesive.

The invention thus provides a method of making a wind turbine blade comprising bonding a shear web to an inner surface of a wind turbine blade shell according to the method described above. The blade shell may be a first half shell of the wind turbine blade and the method may further comprise bonding a second half shell to the first half shell. The invention also provides a wind turbine blade made according to the above method.

The invention further provides a wind turbine blade comprising a blade shell and a shear web located inside the blade shell, wherein the shear web comprises a web and a mounting flange oriented transverse to the web, the mounting flange being bonded to an inner surface of the blade shell by cured adhesive within an adhesive-filled cavity bounded by a primary seal between the mounting flange and the inner surface of the blade shell.

The wind turbine blade may further comprise one or more spacer elements within the adhesive-filled cavity between the mounting flange and the inner surface of the blade shell. The spacer elements are preferably made of substantially incompressible material. The mounting flange of the shear web may include one or more adhesive inlet ports and/or one or more vacuum ports.

The wind turbine blade preferably comprises a secondary seal between the mounting flange and the inner surface of the blade shell. The secondary seal preferably at least partially surrounds the primary seal and more preferably completely surrounds the primary seal. The secondary seal is preferably spaced apart from the primary seal to define a peripheral cavity between the first and secondary seals.

As the adhesive is contained within the primary cavity, the peripheral cavity is preferably substantially free from adhesive.

The shear web preferably comprises a pair of mounting flanges that extend respectively along opposite longitudinal edges of the shear web. One of the mounting flanges is preferably bonded to the inner surface of the blade shell on a windward side of the shell, and the other mounting flange is bonded to the inner surface of the blade shell on a leeward side of the shell.

The invention also provides a wind turbine having a wind turbine blade as described above.

The invention also provides a shear web comprising a web and a mounting flange oriented transverse to the web, wherein one or more seals are integrated with the mounting flange. The mounting flange preferably further comprises one or more adhesive ports and/or one or more vacuum ports.

Optional features described in relation to the invention when expressed in terms of a method also apply to the invention when expressed in terms of a wind turbine blade or in terms of a shear web, and vice versa. Repetition of such features has been avoided where possible purely for reasons of conciseness.

BRIEF DESCRIPTION OF THE DRAWINGS

FIGS. 1 and 2a-2c have already been described above by way of background to the present invention. In order that the present invention may be more readily understood, examples of the invention will now be described with reference to FIGS. 3-9, in which:

DETAILED DESCRIPTION

Figure 3:
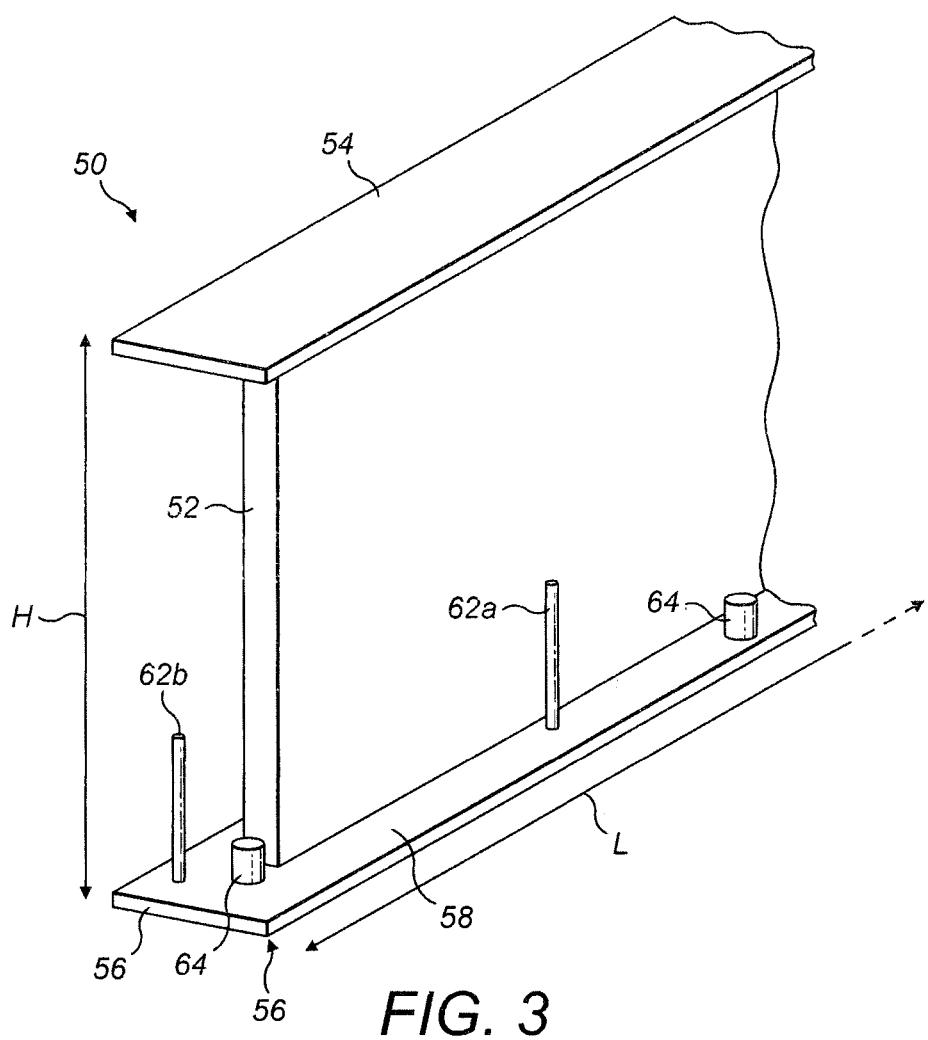
FIG. 3 is a perspective view of part of a shear web comprising a web disposed between upper and lower mounting flanges according to an embodiment of the present invention.

Referring to FIG. 3, this shows a first end of a longitudinally-extending shear web 50 according to an embodiment of the present invention. The shear web 50 is approximately 80 metres in length (L) and varies in height (H) along its length, with a maximum height at one end of about 4.5 metres. The shear web 50 is substantially I-shaped in cross section and comprises a substantially vertical web 52 disposed between upper and lower mounting flanges 54, 56.

The mounting flanges 54, 56 are arranged substantially perpendicular to the web 52 in this example, i.e. substantially horizontal.

Figure 1:
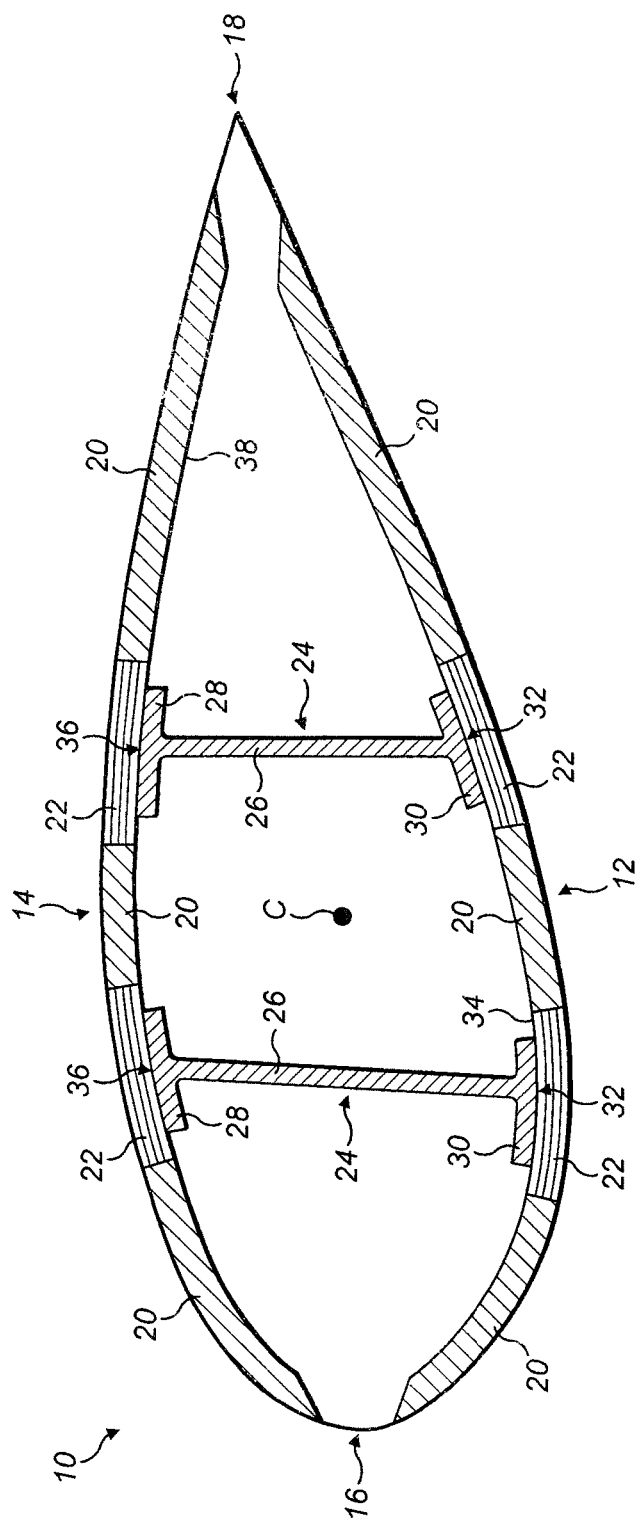
Figure 2A:
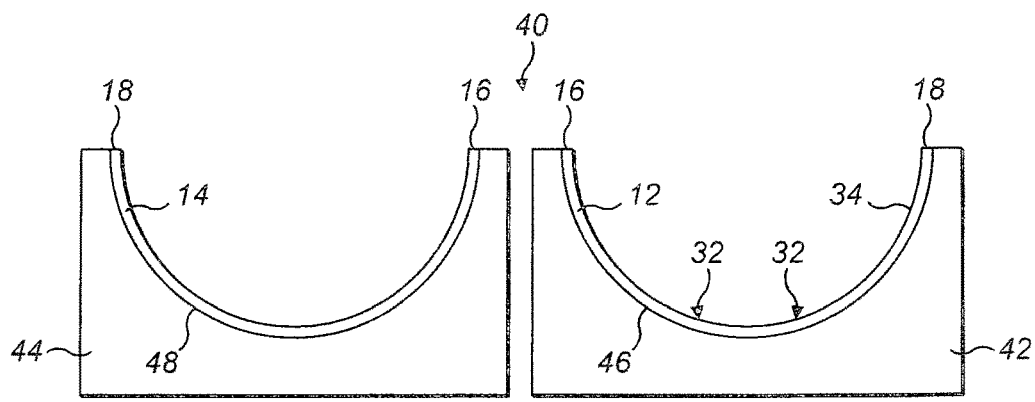
Figure 2B:
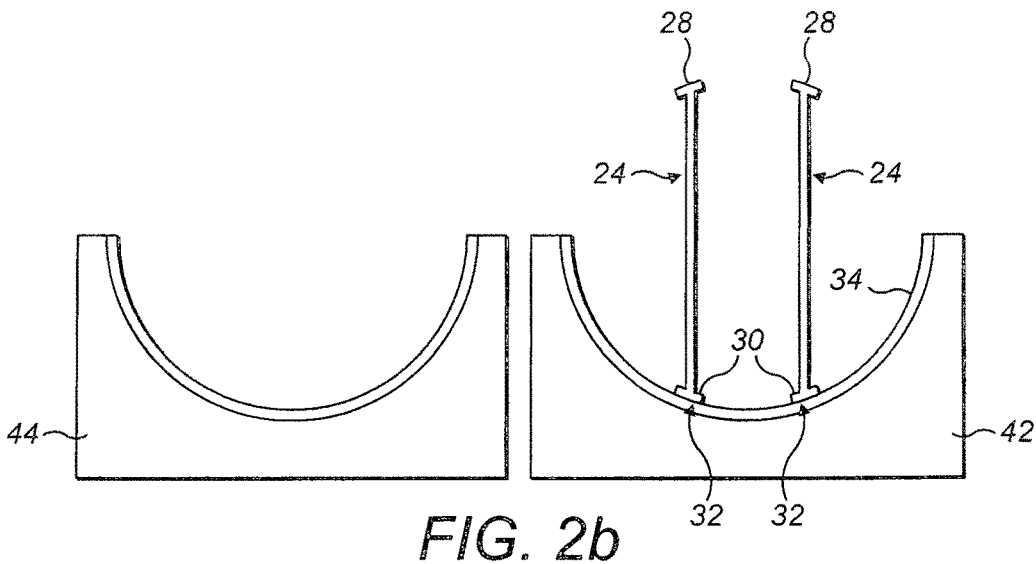
Figure 2C:
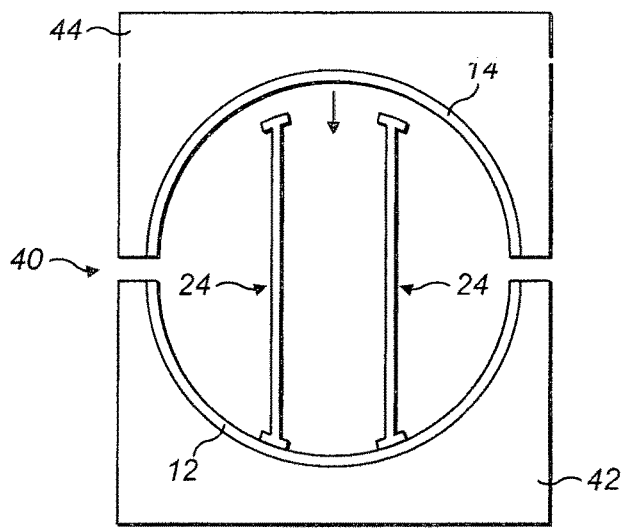

The lower mounting flange 56 comprises an inner surface 58 and an outer surface 60. The terms 'inner' and 'outer' are relative to a central longitudinal axis of a wind turbine blade in which the shear web 50 is affixed in use (e.g. the central longitudinal axis (C) of the blade 10 in FIG. 1, which extends perpendicular to the page in FIG. 1). The outer surface 60 of the lower mounting flange 56 is shown in plan view in FIG. 5, whilst the inner surface 58 of the lower mounting flange 56 is shown in plan view in FIG. 6. The dashed lines in FIG. 6 indicate the position of the web 52.

Figure 4:
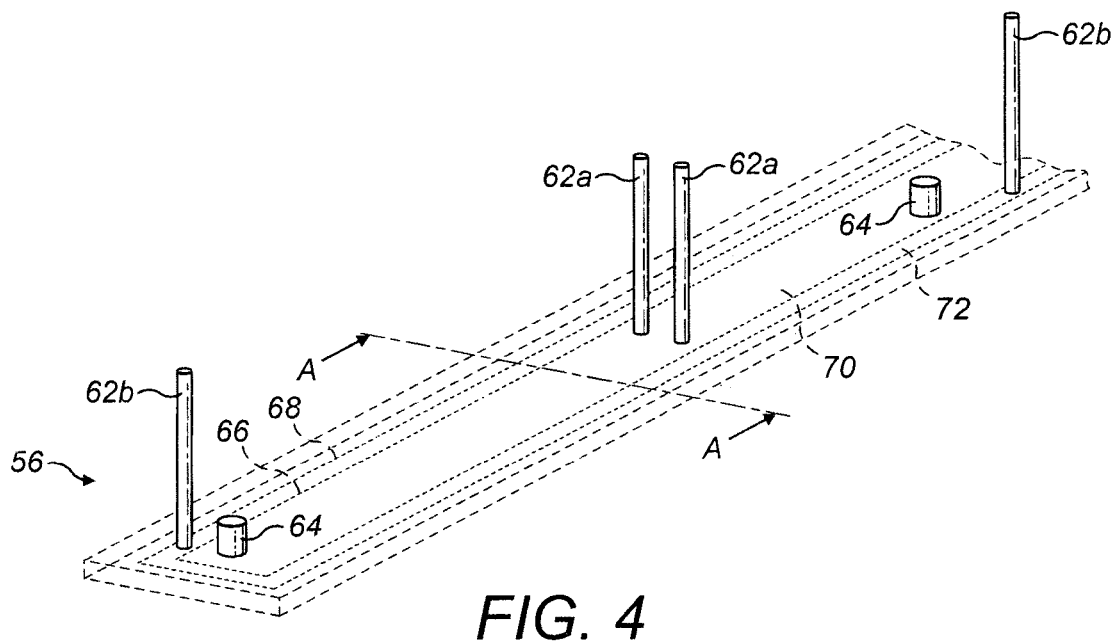
FIG. 4 is a transparent perspective view of part of the lower mounting flange of the shear web.
Figure 5:
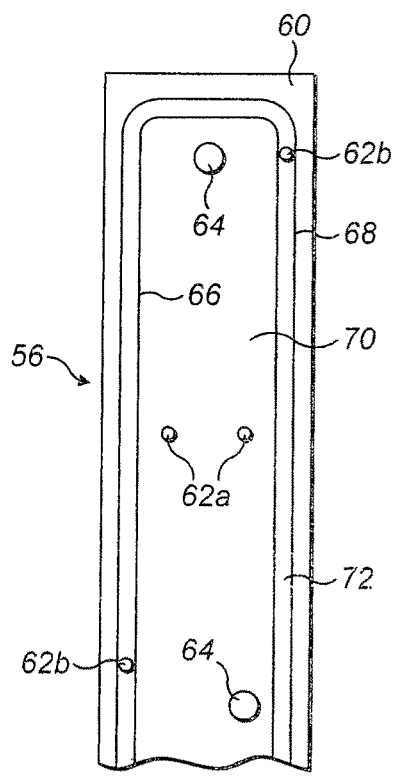
FIG. 5 is a plan view of an outer surface of the lower mounting flange of the shear web.
Figure 6:
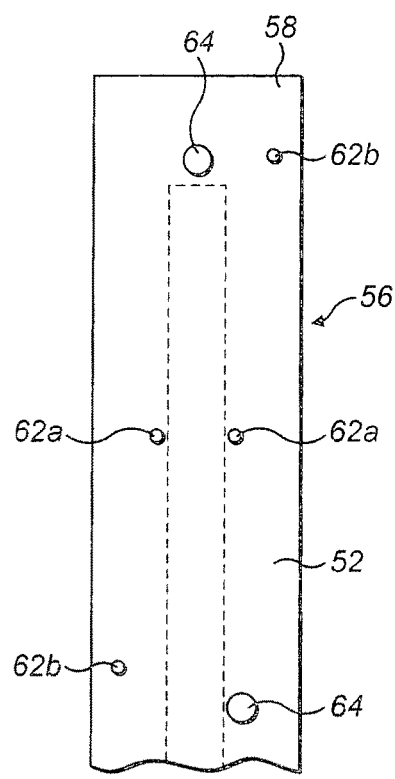
FIG. 6 is a plan view of an inner surface of the lower mounting flange of the shear web.

Referring now also to FIG. 4, which is a transparent perspective view of the lower mounting flange 56 in which the web 52 has been omitted for clarity, and also to the plan views of FIGS. 5 and 6, a plurality of vacuum ports 62a, 62b and a plurality of adhesive inlet ports 64 are located on the inner surface 58 of the lower mounting flange 56. A primary seal 66 and a secondary seal 68 are provided on the outer surface 60 of the lower mounting flange 56.

The primary and secondary seals 66, 68 are vacuum-tight seals and are made from butyl-rubber. The primary seal 66 is arranged in a rectangle such that a rectangular primary region 70 is defined within the primary seal 66. The secondary seal 68 is also arranged in a rectangle and surrounds the primary seal 66. The secondary seal 68 is spaced slightly apart from the primary seal 66, by approximately 2 cm in this example, such that a peripheral region 72 is defined between the two seals 66, 68.

When the lower mounting flange 56 of the shear web 50 is positioned against a surface (see FIG. 7), such as the inner surface 74 of a blade shell 75, the primary seal 66 defines a substantially rectangular primary cavity 76 between the lower mounting flange 56 and the surface 74, and the secondary seal 68 defines a peripheral cavity 78 surrounding the primary cavity 76. In other words, the primary region 70 and the peripheral region 72 described above become substantially enclosed cavities 76, 78. The primary cavity 76 is located directly below the web portion 52 of the shear web 50.

Figure 7:
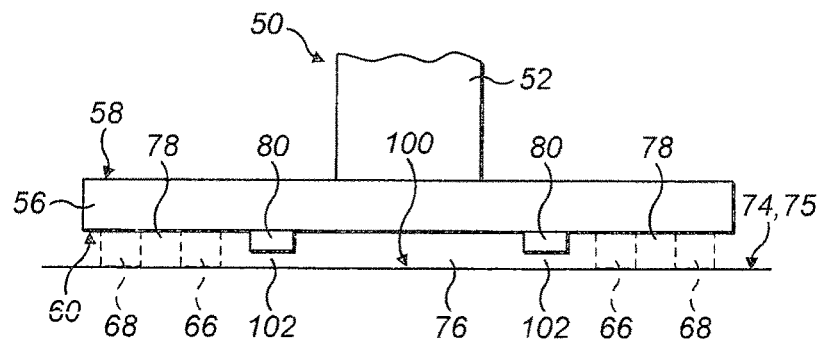
FIG. 7 is a schematic cross-sectional view of the lower mounting flange of the shear web taken along the line A-A in FIG. 4, with the shear web positioned against an inner surface of a blade shell.

Referring still to FIGS. 4-6 in addition to FIG. 7, the plurality of vacuum ports 62a, 62b referred to above includes a first set of vacuum ports 62a and a second set of vacuum ports 62b. The first set of vacuum ports 62a are in fluid communication with the primary cavity 76 in use, i.e. they extend into the primary region 70 bound by the primary seal 66. The second set of vacuum ports 62b are in fluid communication with the peripheral cavity 78, i.e. they extend into the peripheral region 72 defined between the seals 66, 68. The adhesive inlet ports 64 referred to above are in fluid communication with the primary cavity 76. Notably, the first set of vacuum ports 62a are spaced apart from the adhesive inlet ports 64 in a longitudinal direction L (see FIG. 1) of the shear web 50. The effect of this arrangement will be described in further detail later.

As shown most clearly in FIG. 3, the vacuum ports 62a, 62b and the adhesive inlet ports 64 project upwardly from the inner surface 58 of the lower mounting flange 56 for easy access. Referring to the plan view of FIG. 6, the various ports 62a, 62b, 64 are distributed around the web 52, which also projects upwardly from the lower mounting flange 56.

Referring now specifically to FIG. 7, which is a partial cross-section through the shear web 50 taken along the line A-A in FIG. 4, a plurality of spacers 80 are also mounted to the outer surface 60 of the lower mounting flange 56. The spacers 80 are located inside the primary region 70 bounded by the primary seal 66, i.e. inside the primary cavity 76 when the shear web 50 is against the surface 74. The spacers 80 are made from substantially non-compressible material such as wood.

During the manufacture of a wind turbine blade, the shear web 50 is bonded to an inner surface 74 of a blade shell as will now be described.

Figure 9:
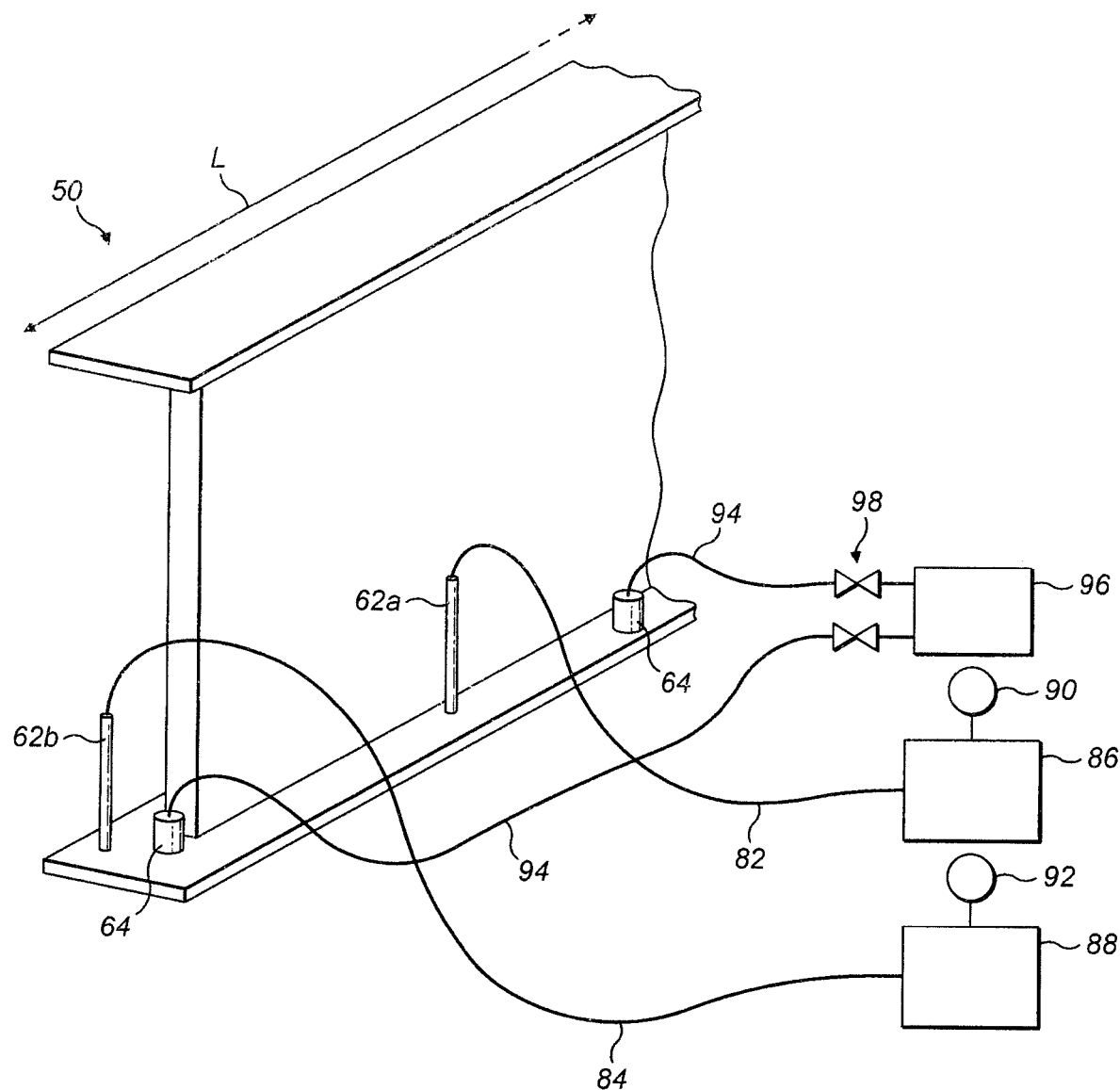
FIG. 9 shows a vacuum system and an adhesive system connected to vacuum ports and adhesive inlet ports located on the lower mounting flange of the shear web.

Referring to FIG. 9, a first set of vacuum lines 82 (one of which is shown in FIG. 9) are connected respectively to the first set of vacuum ports 62a and a second set of vacuum lines 84 (one of which is shown in FIG. 9) are connected to the second set of vacuum ports 62b. The first set of vacuum lines 82 are connected to a first vacuum pump 86, and the second set of vacuum lines 84 are connected to a second vacuum pump 88. The first vacuum pump 86 includes a first pressure gauge 90 and the second vacuum pump 88 includes a second pressure gauge 92. A plurality of adhesive inlet hoses 94 are each connected at one end to a respective adhesive inlet port 64 and at the other end to a source of adhesive 96. One or more adhesive inlet valves 98 are provided in the adhesive lines 94 for controlling the flow of adhesive. One or more adhesive pumps may also be provided in the adhesive inlet lines 94 if required. The vacuum pumps 86, 88 and the adhesive source 96 are conveniently located remotely from the shear web 50, for example in a process room.

Referring again to FIG. 7, the shear web 50 is initially positioned against the inner surface 74 of the blade shell 75 and arranged such that the web 52 is located over a predefined bonding region 100 defined on the blade shell 75, i.e. the region where a bondline between the shear web 50 and the blade shell 75 is to be created. When positioned against the inner surface 74 of the blade shell 75, the shear web 50 is supported against the surface 74 by the primary and secondary seals 66, 68. In this position the seals 66, 68 are compressed slightly under the weight of the shear web 50. Notably, the thickness of the spacer blocks 80 is selected such that there is clearance 102 between the spacers 80 and the surface 74 of the shell 75 when the seals 66, 68 are compressed under the weight of the shear web 50.

Figure 8:
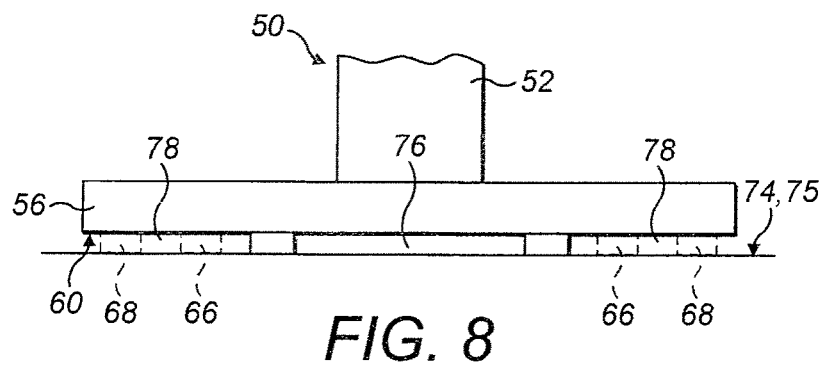
FIG. 8 is a cross-sectional view of the lower mounting flange of the shear web when sealed against the inner surface of the blade shell.

Referring now additionally to FIG. 8, with the shear web 50 in position against the surface 74 of the blade shell 75, the vacuum pumps 86, 88 are turned on. The first vacuum pump 86 draws air out of the primary cavity 76 through the first set of vacuum lines 82 and the second vacuum pump 88 draws air out of the peripheral cavity 78 through the second set of vacuum lines 84. The removal of air from the primary and peripheral cavities 76, 78 creates an effective vacuum within each of the cavities 76, 78. The creation of a vacuum within the respective cavities 76, 78 causes the lower mounting flange 56 to be pulled closer to the inner surface 74 of the blade shell 75, which compresses the primary and secondary seals 66, 68 further and causes them to seal tightly against the surface 74.

The lower mounting flange 56 is pulled towards the surface 74 until the spacer blocks 80 make contact with the surface 74 of the shell 75. As the spacers 80 are incompressible, the lower mounting flange 56 is prevented from being pulled any closer towards the inner surface 74 of the blade shell 75. The spacers 80 thereby ensure that the primary cavity 76 remains open, i.e. that a clearance is maintained between the lower mounting flange 56 and the inner surface 74 of the blade shell 75 when a vacuum is established in the respective cavities 76, 78.

As the primary cavity 76 and the peripheral cavity 78 are sealed independently of one another, and are connected to independent vacuum systems, two distinct vacuum zones are created in the primary and peripheral cavities 76, 78 respectively. The vacuum pumps 86, 88 are configured to maintain a slightly stronger vacuum in the peripheral cavity 78 than in the primary cavity 76, or in other words a slightly lower pressure in the peripheral cavity 78 than in the primary cavity 76. In this example, a vacuum pressure of approximately −1 bar is maintained in the peripheral cavity 78 and a slightly higher pressure is maintained in the primary cavity 76. Accordingly, the vacuum in the peripheral cavity 78 pulls the lower mounting flange 56 of the shear web 50 at a higher level than the primary cavity 76 and functions as a clamp around the primary cavity 76.

Once vacuums have been established in the respective cavities 76, 78, adhesive is admitted into the primary cavity 76 via the adhesive inlet ports 64. As mentioned previously, the adhesive inlet ports 64 are spaced apart from the first set of vacuum ports 62a in the longitudinal direction L of the shear web 50. Accordingly, the adhesive flows or 'infuses' in a longitudinal direction L inside the primary cavity 76 from the adhesive inlet ports 64 towards the first set of vacuum outlet ports 62a. As the adhesive is drawn into the primary cavity 76 under vacuum, the injection back pressure is minimised and the primary cavity 76 fills with adhesive.

The vacuum pressures in the primary and peripheral cavities 76, 78 are monitored throughout the adhesive infusion process using the vacuum gauges 90, 92 associated with the vacuum pumps 86, 88. Once the primary cavity 76 is full of adhesive, the pressure inside the primary cavity 76 will suddenly change (i.e. the vacuum gauge 90 will suddenly register a very high negative pressure of, for example, around −200 bar). This sudden change in pressure indicates that the primary cavity 76 is full of adhesive, i.e. the adhesive injection process is complete. At this stage, the adhesive supply is turned off by closing the adhesive inlet valve(s) 98 to prevent further adhesive entering the primary cavity 76.

The adhesive is then left to cure, i.e. harden, which results in the lower mounting flange 56 forming a strong bond to the inner surface 74 of the blade shell 75.

As the peripheral cavity 78 pulls at a higher level than the primary cavity 76, the peripheral cavity 78 advantageously reacts the pressure from the injected adhesive at the adhesive inlet ports 64 and over the bond area and thus prevents the injected adhesive from forcing the two surfaces 60, 74 apart and breaking the primary seal 66. In other words, the evacuated peripheral cavity 78 serves to prevent leaks developing at the primary seal 66. In the unlikely event that the primary seal 66 does develop a leak, adhesive will flow into the peripheral cavity 78. This will cause a sudden change in pressure in the peripheral cavity 78, which can be detected by the pressure gauge 92 of the vacuum pump 88 associated with the peripheral cavity 78. If a leak is detected then it may be necessary to suspend the infusion process until the leak has been repaired.

A further advantage of the stronger vacuum in the peripheral cavity 78 is that any air ingress in the process will be removed from the system away from the bondline because the bondline is created within the primary cavity 76.

As the adhesive is contained within the primary cavity 76, wastage of adhesive caused by squeeze out is eliminated. This reduces the overall amount of adhesive required in the bondline and hence reduces the overall weight of the completed blade and the materials cost of the adhesive. The dimensions of the resulting bondline between the shear web 50 and the blade shell 75 are advantageously well defined, i.e. they are defined by the dimensions of the primary cavity 76. The dimensions of the primary cavity 76 are predefined by the shape of the region 70 bound by the primary seal 66 and the height of the spacers 80. Accordingly, the invention provides a repeatable process for creating consistently well-defined bondlines.

As the process can be controlled and monitored by the remotely-located vacuum gauges 90, 92, the entire bonding process can be controlled and monitored remotely from the blade. This is particularly advantageous and facilitates a single-stage bonding process, i.e. in which the shear web 50 is bonded to both the windward half shell and the leeward half shell simultaneously using simultaneous infusion at each bondline. Such a process is made possible with the bonding method of the present invention because there is no requirement to have direct access to the bondline during the bonding process.

Many modifications may be made to the above examples without departing from the scope of the present invention as defined in the accompanying claims.

For example, whilst the above examples relate to the creation of a bond between the lower mounting flange 56 of the shear web 50 and the blade shell, the bond could alternatively or additionally be created between the upper mounting flange 54 and the blade shell. As mentioned above, the process could be used simultaneously along the upper and lower mounting flanges 54, 56 to bond the shear web 50 to both the windward shell and the leeward shell simultaneously. The method would therefore involve closing the mould prior to bonding the shear web 50 to the respective blade shells. Accordingly, the method lends itself to a single-stage bonding process.

Whilst a shear web 50 having an I-shaped cross section is described in the above examples, the shear web 50 may have a different shape in other examples. For example, the shear web 50 may be substantially C-shaped in cross-section or the web 52 may have L-shaped flanges at each end. The mounting flanges 54, 56 need not be perpendicular to the web 52, and in other examples the mounting flanges 54, 56 may be arranged at other transverse angles to the web 52, for example more or less than ninety degrees. The angle of the mounting flanges 54, 56 relative to the web 52 will depend on the local contour of the blade shell at which the shear web 50 is to be fixed, i.e. in a chordwise direction of the blade shell.

Whilst in the above examples the adhesive inlet ports 64 and the vacuum ports 62a are arranged so as to create a longitudinal, i.e. spanwise flow of adhesive in the primary cavity 76, the ports 62a, 64 may alternatively be arranged to create a chordwise flow for example. In this case, the resin inlet ports 64 may be spaced apart from the vacuum ports 62a in a widthwise direction of the primary cavity 76.

Whilst the various ports 62a, 62b, 64 in the above examples are provided in the mounting flange 56 of the shear web 50, the ports 62a, 62b, 64 may alternatively be provided in other suitable positions. For example, the ports 62a, 62b, 64 may be provided in the seals 66, 68 or in the blade shell or other such surface to which the shear web 50 is bonded.

Whilst the above examples relate to the creation of a bond between a shear web 50 and a wind turbine blade shell 75, various features of the invention (for example the double seal arrangement) may be utilised for other bonds, such as the bonds between respective half shells of a wind turbine blade.

For the avoidance of doubt, relative terms such as 'upper' and 'lower' as used in the preceding description are used for convenience and refer to the orientation of features as shown in the figures. These terms are not intended to limit the scope of the invention.

The invention claimed is:

1. A method of bonding a shear web to a wind turbine blade shell, the shear web comprising a web and a mounting flange oriented transverse to the web, and the method comprising:
    positioning the shear web relative to the wind turbine blade shell such that the mounting flange is in mutually opposed relation with an inner surface of the wind turbine blade shell;
    providing a primary seal between the mounting flange and the inner surface of the wind turbine blade shell, the primary seal defining an enclosed primary cavity between the mounting flange and the inner surface of the wind turbine blade shell;
    providing a secondary seal between the mounting flange and the inner surface of the wind turbine blade shell, the secondary seal at least partially surrounding the primary seal and being spaced apart from the primary seal to define a peripheral cavity between the primary and secondary seals, the peripheral cavity at least partially surrounding the primary cavity;
    removing air from the primary cavity to create a vacuum in the primary cavity;
    removing air from the peripheral cavity to create a vacuum in the peripheral cavity;
    admitting adhesive into the primary cavity while maintaining the vacuum in the peripheral cavity; and
    curing the adhesive in the primary cavity, and
    wherein after the shear web is bonded to the wind turbine blade shell, the peripheral cavity is void of cured adhesive.

2. The method of claim 1, further comprising:
    providing at least one spacer element in the primary cavity between the mounting flange and the inner surface of the wind turbine blade shell, the at least one spacer element being configured to maintain the mounting flange and the inner surface of the wind turbine blade shell in spaced apart relation when the vacuum is created in the primary cavity.

3. The method of claim 1, further comprising monitoring a pressure in the primary cavity and determining when the primary cavity is full of the adhesive by a sudden change in the monitored pressure.

4. The method of claim 1, further comprising admitting the adhesive into the primary cavity via one or more adhesive ports arranged in fluid communication with the primary cavity.

5. The method of claim 4, wherein the one or more adhesive ports are provided in the mounting flange of the shear web.

6. The method of claim 1, further comprising removing the air from the primary cavity through one or more vacuum ports provided in fluid communication with the primary cavity.

7. The method of claim 6, wherein the one or more vacuum ports are provided in the mounting flange of the shear web.

8. The method of claim 1, further comprising removing the air from the peripheral cavity through one or more vacuum ports provided in fluid communication with the peripheral cavity.

9. The method of claim 8, wherein the one or more vacuum ports are provided in the mounting flange of the shear web.

10. The method of claim 1, comprising reducing a pressure in the peripheral cavity to a lower level than in the primary cavity so as to create a stronger vacuum in the peripheral cavity than in the primary cavity.

11. The method of claim 1, further comprising monitoring a pressure in the peripheral cavity and detecting the presence of a leak in the primary seal from a sudden change in the monitored pressure.

12. The method of claim 1, comprising admitting the adhesive into the primary cavity once the vacuum has been created in the primary cavity and the vacuum has been created in the peripheral cavity.

13. The method of claim 1, further comprising causing the adhesive to flow in a longitudinal direction within the primary cavity.

14. The method of claim 1, wherein removing air from the primary cavity creates a first vacuum in the primary cavity and wherein the removing air from the peripheral cavity creates a second vacuum.

15. The method of claim 14, where the second vacuum is greater than the first vacuum.

16. The method of claim 1, wherein the vacuum in the peripheral cavity is maintained while curing the adhesive.

17. A wind turbine blade comprising a blade shell and a shear web located inside the blade shell, wherein the shear web comprises a web and a first mounting flange oriented transverse to the web, the first mounting flange being bonded to an inner surface of the blade shell by cured adhesive within an adhesive-filled cavity bounded by a primary seal between the first mounting flange and the inner surface of the blade shell, the wind turbine blade having a secondary seal between the first mounting flange and the inner surface of the blade shell, the secondary seal at least partially surrounding the primary seal and being spaced apart from the primary seal to define a peripheral cavity between the primary and secondary seals, wherein the peripheral cavity is void of cured adhesive.

18. The wind turbine blade of claim 17, further comprising one or more spacer elements within the adhesive-filled cavity between the first mounting flange and the inner surface of the blade shell.

19. The wind turbine blade of claim 18, wherein the one or more spacer elements are made of incompressible material.

20. The wind turbine blade of claim 17, wherein the first mounting flange of the shear web includes one or more adhesive inlet ports and/or one or more vacuum ports.

21. The wind turbine blade of claim 17, wherein the peripheral cavity is free from adhesive.

22. The wind turbine blade of claim 17, wherein the shear web comprises a second mounting flange, wherein the first and second mounting flanges extend respectively along opposite longitudinal edges of the shear web, and wherein one of the first or second mounting flanges is bonded to the inner surface of the blade shell on a windward side of the blade shell, and the other one of the first or second mounting flanges is bonded to the inner surface of the blade shell on a leeward side of the blade shell.

23. A wind turbine having the wind turbine blade according to claim 17.

24. A method of making a wind turbine blade having a shear web and a wind turbine blade shell, the shear web comprising a web and a mounting flange oriented transverse to the web, and the wind turbine blade shell comprising a first half shell and a second half shell, the method comprising:

forming the first half shell in a first mould half;

positioning the shear web relative to the first half shell such that the mounting flange is in mutually opposed relation with an inner surface of the first half shell;

providing a primary seal between the mounting flange and the inner surface of the first half shell, the primary seal defining an enclosed primary cavity between the mounting flange and the inner surface of the first half shell;

providing a secondary seal between the mounting flange and the inner surface of the first half shell, the secondary seal at least partially surrounding the primary seal and being spaced apart from the primary seal to define a peripheral cavity between the primary and secondary seals, the peripheral cavity at least partially surrounding the primary cavity;

removing air from the primary cavity to create a vacuum in the primary cavity;

removing air from the peripheral cavity to create a vacuum in the peripheral cavity;

admitting adhesive into the primary cavity while maintaining the vacuum in the peripheral cavity; and curing the adhesive in the primary cavity, and wherein after the wind turbine blade is made, the peripheral cavity is void of cured adhesive.

25. The method of claim 24, further comprising bonding the second half shell to the first half shell.

* * * * *